United States Patent [19]
Krimmell

[11] Patent Number: 5,873,586
[45] Date of Patent: Feb. 23, 1999

[54] ROCKING BEAM SUSPENSION

[76] Inventor: John Krimmell, P.O. Box 434, Somers, Mont. 59932

[21] Appl. No.: 610,264

[22] Filed: Mar. 4, 1996

[51] Int. Cl.[6] .............................. B60G 3/01; B60G 3/26; B60G 9/02; B60G 11/50
[52] U.S. Cl. ...................... 280/112.1; 280/697; 280/700; 280/701; 280/721; 280/724
[58] Field of Search ................................. 280/112.1, 111, 280/112.2, 772, 689, 688, 721, 724, 725, 726, 690, 697, 700, 701

[56] References Cited

U.S. PATENT DOCUMENTS

| | | | |
|---|---|---|---|
| 2,138,438 | 11/1938 | Wagner | 280/701 |
| 2,508,130 | 5/1950 | Wharam et al. | 267/274 |
| 2,631,844 | 3/1953 | Paton | 267/274 |
| 3,021,152 | 2/1962 | Fiala | 280/696 |
| 3,024,041 | 3/1962 | Maruhn | 280/724 |
| 3,025,078 | 3/1962 | Allison | 280/721 |
| 3,414,290 | 12/1968 | Wilfert et al. | 280/112.1 |
| 3,701,542 | 10/1972 | Grosseau | 280/721 |
| 3,831,965 | 8/1974 | Dickens | 280/112.2 |
| 4,119,170 | 10/1978 | Hutcherson | 280/112.2 |
| 4,248,447 | 2/1981 | Hart | 280/112.2 |
| 4,647,053 | 3/1987 | Kanno | 280/112.2 |
| 4,650,213 | 3/1987 | Fujita et al. | 280/772 |
| 4,717,164 | 1/1988 | Levavi | 280/112.2 |
| 4,921,263 | 5/1990 | Patin | 280/112.2 |
| 4,974,863 | 12/1990 | Patin | 280/112.2 |

FOREIGN PATENT DOCUMENTS

| | | | |
|---|---|---|---|
| 1471948 | 3/1967 | France | 280/112.1 |
| 1505697 | 8/1970 | Germany | 280/690 |
| 1114753 | 5/1968 | United Kingdom | 280/700 |

OTHER PUBLICATIONS

Road & Track,; May 1972; pp. 84–85; "New No–Camber Suspension".

Road & Track; Feb. 1970; pp. 84–85; "Racing Car Suspensioin: A New Direction?".

Primary Examiner—Peter C. English
Attorney, Agent, or Firm—Harry M. Cross, Jr.

[57] ABSTRACT

The automotive rocking beam suspension comprises a rocking beam assembly pivotably mounted to the chassis structure of a vehicle, a torsion spring connecting the rocking beam assembly to the vehicle chassis structure. A pair of wheel mounting assemblies are mounted to the rocking beam assembly for carrying a wheel, each wheel mounting assembly permitting independent vertical movement of the wheel carried by that wheel mounting assembly. A road spring is associated with each wheel mounting assembly for supporting the chassis structure.

16 Claims, 3 Drawing Sheets

ROCKING BEAM SUSPENSION

BACKGROUND OF THE INVENTION

1. Field of the Invention

This invention relates to the automotive arts and in particular to camber control suspension systems for automotive vehicles.

2. Brief Description of the Prior Art

Automotive engineers have historically faced the need for compromise among the various factors involved in suspension system design. Cost constraints and the need for simplicity have resulted in live axle, strut, swing axle, trailing arm, or double transverse wishbone layouts, or some variant of these arrangements. Although these, and other type independent layouts, have well-known advantages, especially for front suspensions, the potential difficulties of such systems are also well understood. The common undesirable characteristic shared by all of the usual independent suspensions is camber change under bump and/or roll conditions.

SUMMARY OF THE INVENTION

A primary object of the present invention is to provide an automotive rocking beam suspension system that will allow unique differential vertical wheel movements (i.e. one wheel bump) that is not available with some other layouts. Another object is to provide such a system that is characterized by independent vertical wheel motion and maintenance of constant zero camber under flat road cornering conditions, or maintenance of a pre-set camber as a linear function of imposed suspension cornering g-loads. A further object is to provide such a suspension that will provide enhanced camber control and which lends itself to practical designs for many applications. Still another object is to provide such a suspension which achieves these features without the penalty of performance degradation for the other desirable suspension characteristics. Other objects and advantages will become apparent from the following description of the invention.

In accordance with these objects, the rocking beam suspension of this invention comprises a rocking beam pivotably mounted to the chassis structure of a vehicle and a spring, such as a torsion bar, connecting the rocking beam and the vehicle chassis so that the rocking action of the rocking beam is against the resistance of the spring. The rocking beam mounts wheel carriers that enable the wheels to independently ride over bumps while maintaining parallel alignment with one another, with the chassis being supported by the suspension system through suspension springs, or comparable suspension assemblies. Thus, the rocking beam is permitted to rock about an axis parallel to the longitudinal axis of the vehicle against resistance supplied by the torsion bar, independently of the motion of the wheel carriers. Analytic work has demonstrated the feasibility of the system. The degree of torsional stiffness for given applications or parameters is determinable by conventional analytical work. The suspension system of this invention is applicable to a rear wheel suspension, to a front wheel suspension, or to a four wheel suspension.

The automotive rocking beam suspension comprises a rocking beam assembly mounted to a vehicle chassis structure, a spring connecting the rocking beam assembly to the vehicle chassis structure to resist rotation between the rocking beam and the chassis structure, with the torsion spring-rocking beam connection defining the locus of a suspension roll axis. A pair of wheel mounting assemblies are mounted to the rocking beam assembly for carrying a wheel, each wheel mounting assembly permitting independent vertical movement of the wheel carried by that wheel mounting assembly. A road spring is associated with each wheel mounting assembly for supporting the chassis structure.

DESCRIPTION OF THE PREFERRED EMBODIMENT

Figure 1:
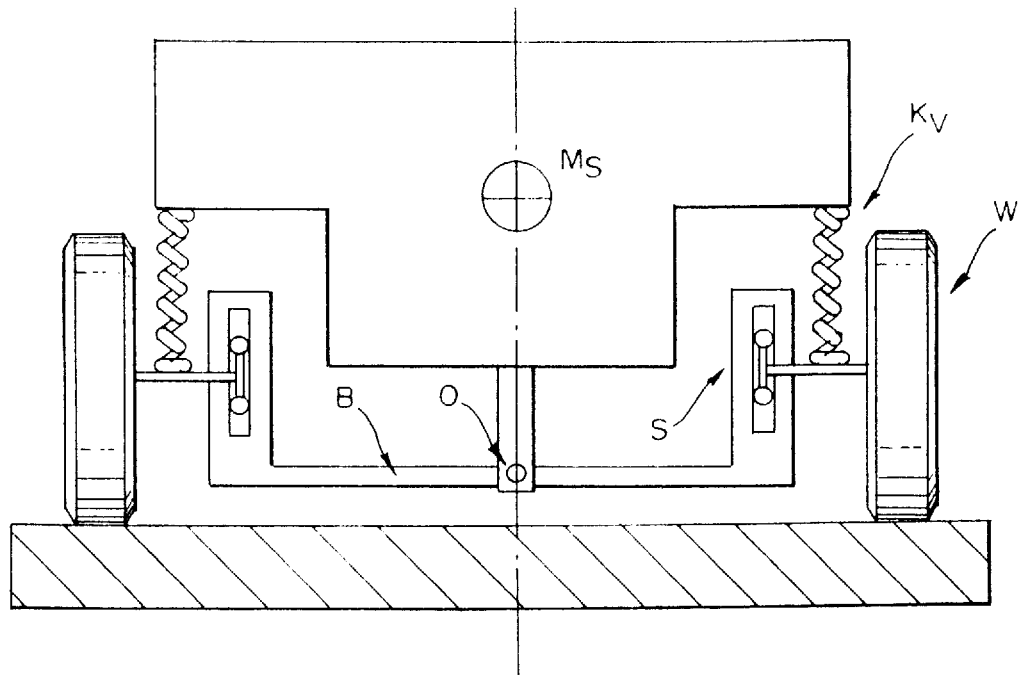
FIG. 1 schematically depicts the rocking beam suspension system of this invention.

With respect to FIGS. 1–5, once the basic idea of this system is grasped, one can visualize a number of different geometric arrangements to incorporate the principle. FIG. 1 represents one of the more easily understood variations. In this FIG. 1, the wheels, W, are carried on inboard extensions incorporating parallel slides, S, the stationary part of which (which is the other part of each kinematic pair) being part of the rocking beam B. Note that beam B is pivoted at O to the sprung mass, $M_s$, representing the vehicle chassis. O, therefore, forms the roll center. The mechanism is completed by the road springs $K_v$, connecting the sprung mass, $M_s$, with the respective wheels, W. Longitudinal wheel location may be effected by links or even built into the slide assemblies. It should be noted that the slides are not an essential feature. Any mechanism providing parallel relative motions between the wheels and beam, B, would serve as well.

Figure 2:
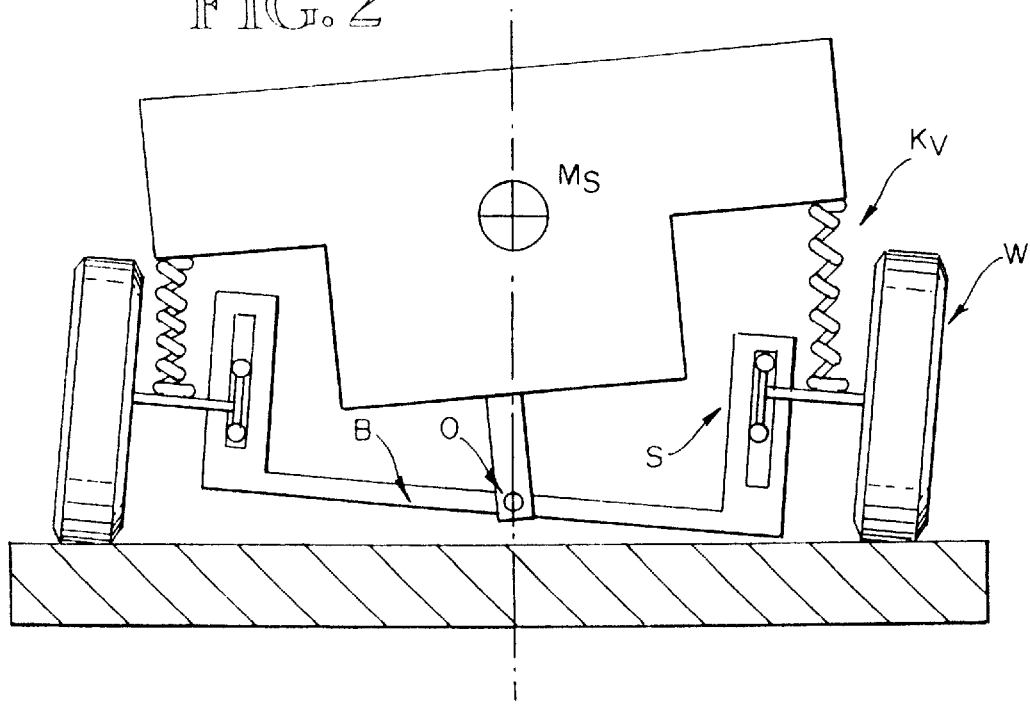
FIG. 2 schematically depicts the FIG. 1 suspension in one kinematic configuration.
Figure 3:
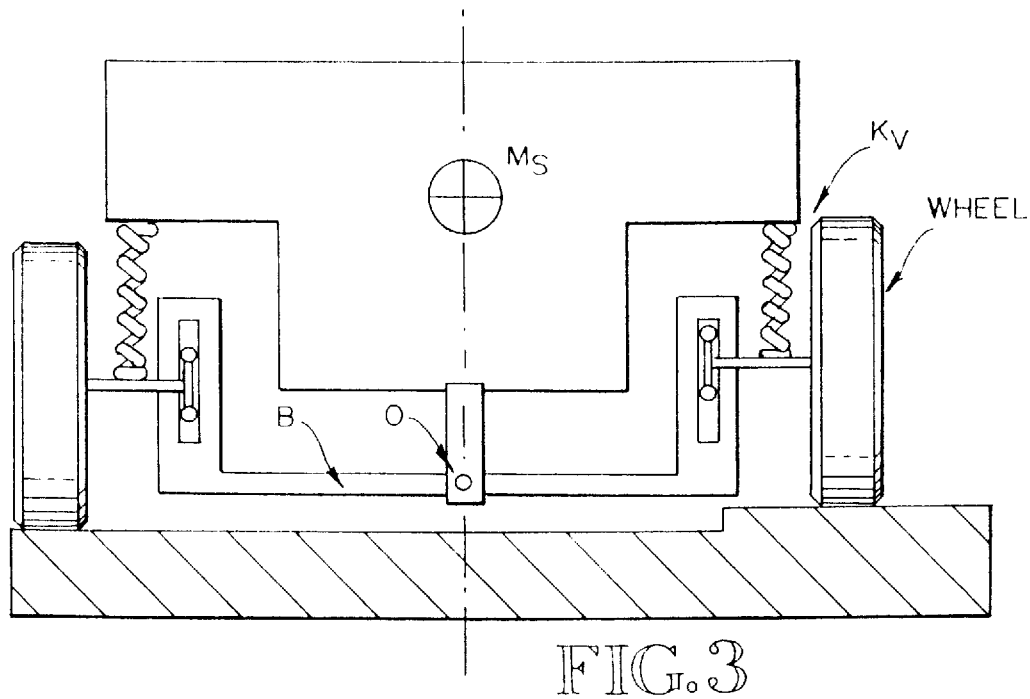
FIG. 3 schematically depicts the FIG. 1 suspension in another kinematic configuration.
Figure 4:
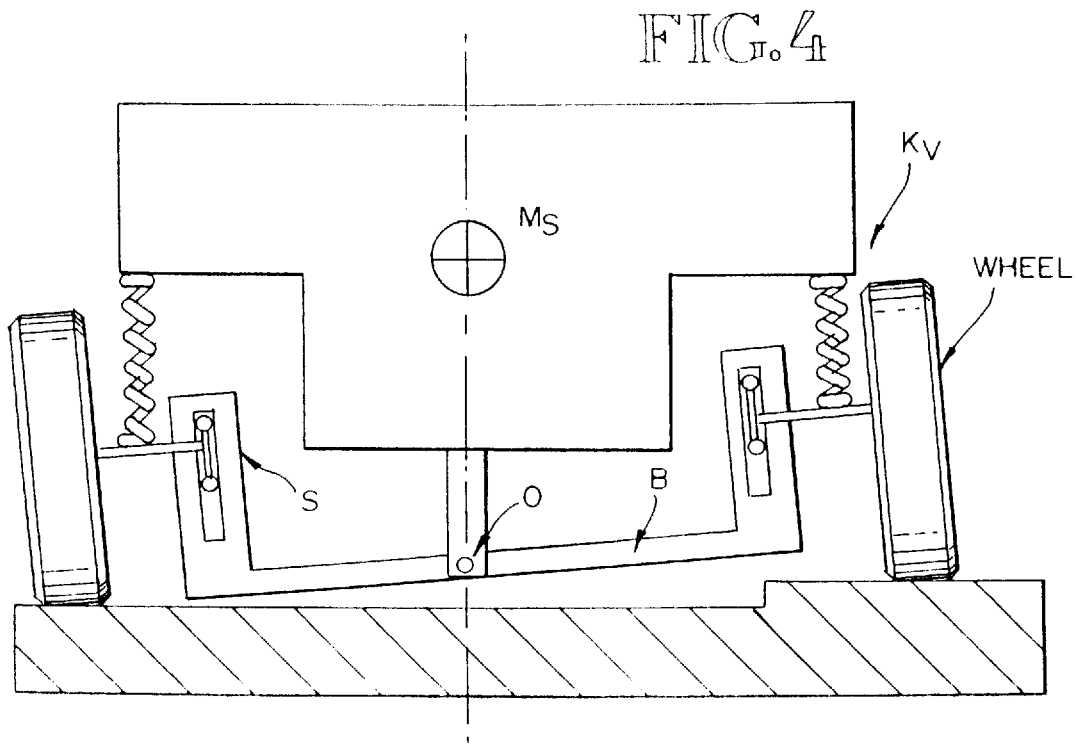
FIG. 4 schematically depicts the FIG. 1 suspension in still another kinematic configuration.

It can be seen from FIG. 1 that, for symmetrical bump conditions, (equal vertical motions of the wheels relative to chassis), the wheels remain parallel. A situation as in FIG. 2 is kinematically possible under static conditions and must be accommodated. One may expect, however, that due to the balance of forces acting in such a case, there will be no camber change. To consider the behavior resulting from a one-wheel bump, the rocking beam accommodates one-wheel bump conditions by a combination of differential movement of the wheels in their slides (as in FIG. 3) and rotation of the rocking beam assembly (as in FIG. 4). For normal mass distributions and geometries, however, a rudimentary dynamic analysis indicates that the FIG. 3 mode predominates. This is in contrast to, for example, the behavior of the classical "de Dion" arrangement and its variants which do not provide differential vertical wheel travel and which will only allow one-wheel bump motion by tilting the entire unsprung mass; this being one undesirable feature because this tilt causes a gyroscopic moment reaction about the vertical axis which is a potentially destabilizing influence when cornering.

To accommodate chassis roll due to cornering on a flat road, it is seen that kinematically sprung mass $M_s$ rotates about pivot O. When the forces are analyzed, however, because the outer spring and wheel carry more load than the inner ones, there is an unbalanced moment action on beam B, causing it to rotate. To counteract this, a torsion spring is interposed between beam B and sprung mass $M_s$ at pivot O. The roll of the chassis, then, applies a moment to beam B via this torsion bar, tending to oppose the rotation of beam B referred to above. The inclusion of a torsion spring at pivot O is the key to proper function of the rocking beam suspension system of this invention. By a judicious choice of the torsion spring stiffness, a range of camber change characteristics due to cornering can be programmed.

There exists a critical value for the stiffness of the torsion bar which will maintain zero camber change during cornering on a flat surface. This critical value can be determined analytically. If the torsion bar is less stiff than the critical value, the wheels at the relevant axle will adopt a negative camber angle proportional to the cornering load (g-load). If the torsion bar stiffness is greater than the critical value, the resulting wheel camber will be positive, again in proportion to the lateral g-load imposed. In this context, positive camber means the top of the tire leans away from the center of curvature of a turn, and negative camber is oppositely defined. Providing a torsion bar with a stiffness that would yield a non-zero camber under cornering conditions could be desirable, within limits, to increase cornering capability.

Figure 5:
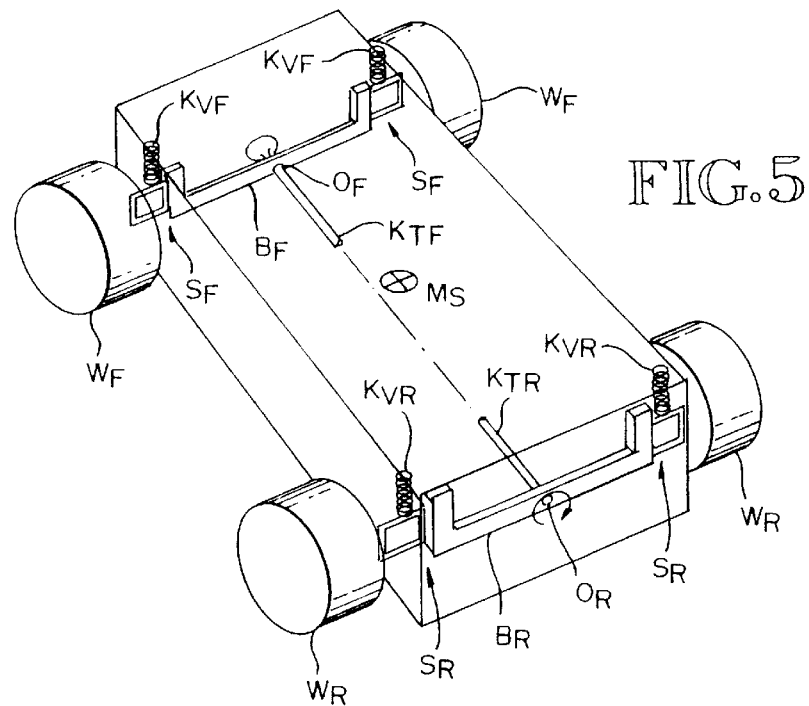
FIG. 5 schematically depicts a vehicle with the FIG. 1 suspension applied to both the front and rear of the vehicle.

FIG. 5 illustrates the application of the simplified FIG. 1 schematic to both the front and rear suspension assemblies, designated by the subscript "f" and "r" respectively. FIG. 5 illustrates the provision of front and rear torsion bars, $K_{tf}$ and $K_{tr}$, attached to the front and rear rocking beams $B_f$ and $B_r$ at $O_f$ and $O_r$, respectively. Both torsion bars are anchored to the chassis represented by $M_s$.

Figure 6:
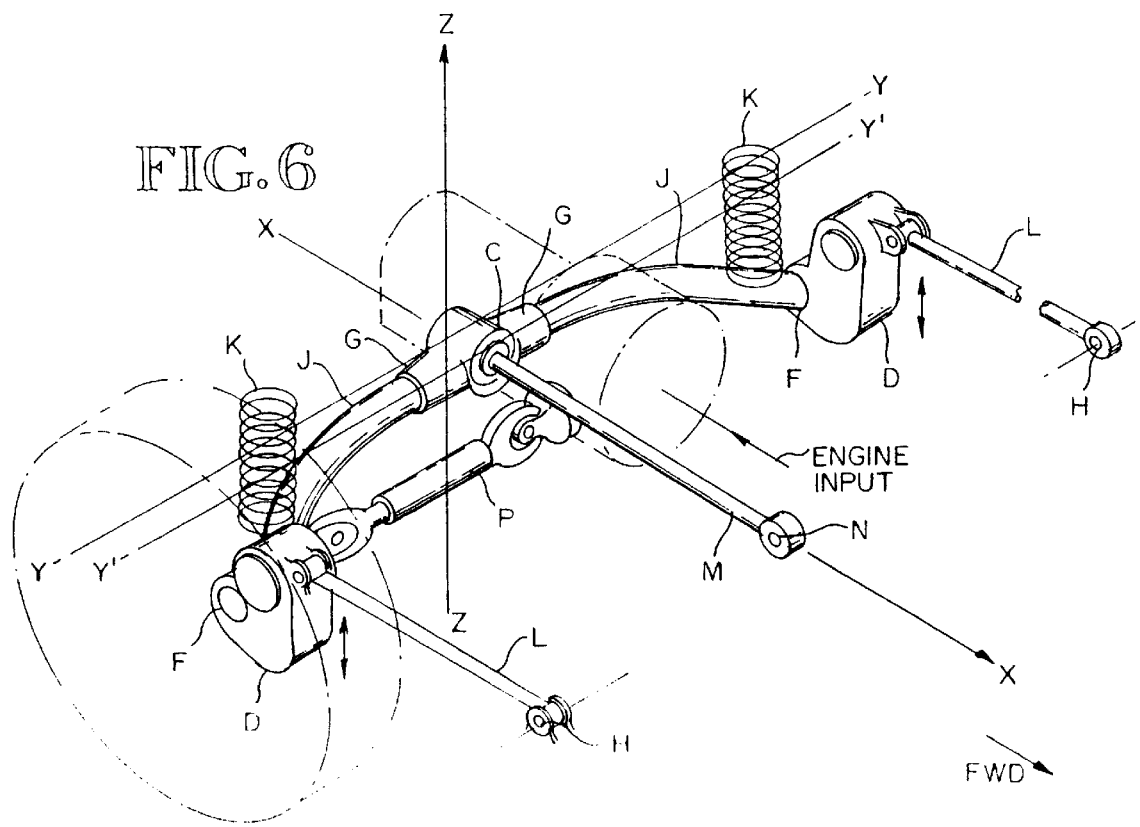
FIG. 6 depicts a practical adaptation of the FIG. 1 suspension as it might be applied to the rear of a rear-wheel drive vehicle.

FIG. 6 illustrates an alternative arrangement to the slide of FIG. 1, the FIG. 6 assembly shown being applied to a rear wheel arrangement. In the FIG. 6 embodiment, the rocking beam is comprised of trunnion housing C. In the FIG. 6 assembly, the rocking beam takes the form a cross-shaped member, trunnion housing C, to which are attached two transverse arms J, J. Trunnion housing C is shown attached below the rear of gearbox E, (or a final drive unit, for front engine application), and defines the roll axis X—X. Trunnion housing C contains a pair of front and rear bearings mounted on the X—X axis (parallel to the longitudinal axis of the vehicle) that attach it to the chassis. Trunnion housing C pivots about the X—X axis relative to the chassis sprung mass. Left and right transverse arms J, J are pivotally connected to left and right pivot thrust bearings mounted in the outboard ends G, G of trunnion housing C. The only degree of freedom of transverse arms J, J relative to trunnion housing C is Y'—Y' axis rotation.

A torsion bar M extends from a mounting point N on the chassis structure to its point of connection with trunnion housing C at the roll axis X—X. Torsion bar M is provided with a stiffness sufficient to resist pivotal movement of the rocking beam to whatever degree is desired. The inner ends of the transverse arms J, J are rotatably mounted in the ends G, G of trunnion housing C by thrust bearings so that the transverse arms J, J can rotate about transverse axis Y'—Y'. Each transverse arm J extends outwardly from its point of connection with trunnion housing C and forwardly with its outer end terminating forward of axis Y'—Y'. The outer end of each transverse arm J is pivotably mounted to a wheel hub carrier D by a bearing F such that hub carrier D can pivot about arm J on an axis parallel to axis Y'—Y'. Each hub carrier D is pivotably connected to a longitudinal arm L, the forward end of arm L being mounted to the chassis structure at H. Vertical wheel travel of wheel W is afforded by rotation of hub carrier D about an axis through bearing F parallel to axis Y'—Y' as transverse arm J rotates about axis Y'—Y'. In so rotating, transverse arm J pivots relative to the pivot bearing mounting in the end G of housing C. A half shaft P extends from the gear box E to each hub carrier D (only one half shaft being shown in FIG. 6) for driving engagement with wheel W.

The loads carried into the rocking beam by the transverse arms are the X- and Z-axis couples, and X- and Y-axis forces. These are the same loads which would be carried by the rocking beam J in FIG. 1.

Transverse arm J is essentially a leading arm, and, therefore, there is no camber change in roll or bump. Since toe in/out is controlled by arm J alone, toe changes in bump or roll will not occur. Each transverse arm J and hub carrier D comprises a wheel carrier comparable to the FIG. 1 inboard extension that incorporates parallel slide S.

The chassis structure is supported by road springs K, K (or other suitable spring assemblies) that extend from the chassis structure to bearing points at the outer ends of the transverse arms J, J. The FIG. 6 assembly provides trunnion housing C that permits transverse arms J, J to rotate in bearing mountings at ends G as wheels W move up and down over bumps. The entire J-C-J assembly rotates about the X—X roll axis against the resistance of torsion bar M.

If the half shafts P are longitudinally positioned relative to their respective hub carriers D and the rocking beam, the track width will not be constant. Therefore, transverse arms J, J must slide relative to bearing mountings at ends G to accommodate track variations. Alternately, track width could be constant and fixed by Y—Y dimensions of the transverse arms J, J. In the case of a constant track width, the half shafts P could be provided with spline joint connections to accommodate the required changes in the effective lengths of the half shafts.

In the FIG. 6 embodiment, the transverse arms J, J and their respective hub carriers D, D are the kinematic equivalent to the FIG. 1 slide assemblies S. In both the FIG. 1 and FIG. 6 embodiments, the wheels are carried by the rocking beam and the wheel mounting mechanism for each wheel permits independent vertical movement of each wheel relative to the chassis structure; and the rocking beam rotation about the roll axis is resisted by a torsion spring that is connected to the rocking beam at the roll axis and to the chassis structure. Thus, the wheel-mounting mechanisms are subject to upward and downward movement by rotation of the rocking beam about the roll axis X—X. The only direct connections of the rocking beam to the chassis structure are the pivot mounting of trunnion housing to the chassis on the X—X roll axis and the torsion spring extended along the X—X axis to its point of connection with the chassis at N.

The road springs K, K constitute an indirect connection only because they support their respective hub carriers D independently of the rocking beam as well as independently of one another. The road springs K, K would typically be included in shock-spring sets.

The torsional resistance provided by torsion bar M to resist torsional, or pivotal, movement between the sprung mass of the chassis and the rocking beam could be provided by a more complex spring arrangement. The provision of a torsion bar to provide resistance to rotation of the rocking beam about the X—X axis is a simple and effective solution to the functional requirement. The spring resistance to rotation of the rocking beam must be located directly between the rocking beam and the chassis, however.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. An automotive rocking beam suspension for an automotive vehicle having a chassis structure for counteracting chassis roll due to cornering, said suspension comprising a rocking beam assembly pivotably mounted to the chassis structure for rotation about a roll axis parallel to the longitudinal axis of the vehicle; a torsion spring means connecting the rocking beam assembly to the vehicle chassis structure to counteract rotation between the rocking beam assembly and the vehicle chassis structure, said torsion spring means having a substantial stiffness selected to be at or above an analytically-determined critical value sufficient to maintain at least zero camber change during cornering on a flat surface so as to prevent respective wheels from adopting a negative camber angle proportional to the cornering load when said vehicle traverses a corner; a pair of wheel mounting assemblies each mounted to the rocking beam assembly for carrying the wheels, each wheel mounting assembly permitting independent vertical movement of the respective wheel carried by that wheel mounting assembly; and a pair of road springs each connecting a respective one of the wheel mounting assemblies to the chassis structure.

2. The suspension of claim 1 wherein said wheel mounting assemblies each comprise a slide assembly having an inboard extension carrying the respective wheel for vertical movement relative to the rocking beam assembly, the two slide assemblies providing slides parallel to one another.

3. The suspension of claim 1 wherein said wheel mounting assemblies each comprise a wheel hub carrier and a transverse arm whereby said suspension includes two wheel hub carriers and two transverse arms, said rocking beam assembly pivotably mounting said transverse arms so that each transverse arm is pivotable independently of the other; and wherein each transverse arm is connected to a respective one of said wheel hub carriers so that the connected wheel hub carrier will be elevated and lowered as its connected transverse arm pivots.

4. The suspension of claim 3 wherein each transverse arm is configured as a leading arm that is transversely coupled to said rocking beam assembly and longitudinally connected to its respective wheel hub carrier.

5. The suspension of claim 1 wherein said torsion spring means connecting said rocking beam assembly to said vehicle chassis structure comprises a torsion bar connected to said rocking beam assembly and to said vehicle chassis structure on said roll axis.

6. The suspension of claim 5 wherein said wheel mounting assemblies each comprise a slide assembly having an inboard extension carrying the respective wheel for vertical movement relative to the rocking beam assembly, the two slide assemblies providing slides parallel to one another.

7. The suspension of claim 5 wherein said wheel mounting assemblies each comprise a wheel hub carrier and a transverse arm whereby said suspension includes two wheel hub carriers and two transverse arms, said rocking beam assembly pivotably mounting said transverse arms so that each transverse arm is pivotable independently of the other; and wherein each transverse arm is connected to a respective one of said wheel hub carriers so that the connected wheel hub carrier will be elevated and lowered as its connected transverse arm pivots.

8. The suspension of claim 7 wherein each transverse arm is configured as a leading arm that is transversely coupled to said rocking beam assembly and longitudinally connected to its respective wheel hub carrier.

9. A front and rear automotive rocking beam suspension system for an automotive vehicle having a chassis structure and front and rear suspensions, each said front and rear suspension comprising a rocking beam assembly pivotably mounted to the chassis structure for rotation about a roll axis parallel to the longitudinal axis of the vehicle; a torsion spring means connecting the rocking beam assembly to the vehicle chassis structure to counteract rotation between the rocking beam assembly and the vehicle chassis structure, said torsion spring means having a substantial stiffness selected to be at or above an analytically-determined critical value sufficient to maintain at least zero camber change during cornering on a flat surface so as to prevent respective wheels from adopting a negative camber angle proportional to the cornering load when said vehicle traverses a corner; a pair of wheel mounting assemblies each mounted to the rocking beam assembly for carrying the wheels, each wheel mounting assembly permitting independent vertical movement of the wheel carried by that wheel mounting assembly; and a pair of road springs each connecting a respective one of the wheel mounting assemblies to the chassis structure.

10. The suspension system of claim 9 wherein said wheel mounting assemblies each comprise a slide assembly having an inboard extension carrying the respective wheel for vertical movement relative to the rocking beam assembly, the two slide assemblies providing slides parallel to one another.

11. The suspension system of claim 9 wherein said wheel mounting assemblies each comprise a wheel hub carrier and a transverse arm whereby said front and rear suspensions each include two wheel hub carriers and two transverse arms, said rocking beam assembly pivotably mounting said transverse arms so that each transverse arm is pivotable independently of the other; and wherein each transverse arm is connected to a respective one of said wheel hub carriers so that the connected wheel hub carrier will be elevated and lowered as its connected transverse arm pivots.

12. The suspension system of claim 11 wherein each transverse arm is configured as a leading arm that is transversely coupled to said rocking beam assembly and longitudinally connected to its respective wheel hub carrier.

13. The suspension system of claim 9 wherein said torsion spring means connecting said rocking beam assembly to said vehicle chassis structure comprises a torsion bar connected to said rocking beam assembly and to said vehicle chassis on said roll axis.

14. The suspension system of claim 13 wherein said wheel mounting assemblies each comprise a slide assembly having an inboard extension carrying the respective wheel for vertical movement relative to the rocking beam assembly, the two slide assemblies providing slides parallel to one another.

15. The suspension system of claim 13 wherein said wheel mounting assemblies each comprise a wheel hub carrier and a transverse arm whereby said front and rear suspensions each include two wheel hub carriers and two transverse arms, said rocking beam assembly pivotably mounting said transverse arms so that each transverse arm is pivotable independently of the other; and wherein each transverse arm is connected to a respective one of said wheel hub carriers so that the connected wheel hub carrier will be elevated and lowered as its connected transverse arm pivots.

16. The suspension system of claim 15 wherein each transverse arm is configured as a leading arm that is transversely coupled to said rocking beam assembly and longitudinally connected to its respective wheel hub carrier.

* * * * *